US012590532B1

(12) United States Patent　　　　　(10) Patent No.: US 12,590,532 B1
Shrivastava et al.　　　　　　　　　　(45) Date of Patent:　　Mar. 31, 2026

(54) DEVICES, SYSTEMS, AND METHODS FOR ESTIMATING FLOW RATES IN A PLUNGER LIFT SYSTEM

(71) Applicant: Schlumberger Technology Corporation, Sugar Land, TX (US)

(72) Inventors: Kaustubh Shrivastava, Houston, TX (US); Agustin Gambaretto, Houston, TX (US); Jason Baihly, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/097,926

(22) Filed: Apr. 2, 2025

(51) Int. Cl.
　　*E21B 43/12*　　　(2006.01)
　　*E21B 47/06*　　　(2012.01)
　　*E21B 49/08*　　　(2006.01)
　　*F04F 1/08*　　　 (2006.01)
　　*G01L 13/00*　　 (2006.01)
(52) U.S. Cl.
　　CPC ............ *E21B 47/06* (2013.01); *E21B 43/122* (2013.01); *E21B 49/08* (2013.01); *G01L 13/00* (2013.01); *E21B 2200/20* (2020.05)

(58) Field of Classification Search
　　CPC .. E21B 43/122; E21B 43/121; E21B 2200/20; F04F 1/08
　　See application file for complete search history.

(56)　　　　　References Cited

U.S. PATENT DOCUMENTS

| | | | | |
|---|---|---|---|---|
| 3,941,510 A * | 3/1976 | Morgan | .................... | F04F 1/06 |
| | | | | 417/58 |
| 5,105,889 A * | 4/1992 | Misikov | ................ | E21B 43/124 |
| | | | | 166/372 |
| 6,634,426 B2 * | 10/2003 | McCoy | ................. | E21B 47/008 |
| | | | | 137/487 |
| 11,293,272 B2 * | 4/2022 | Lomasney | ................ | C25D 7/04 |
| 11,459,862 B2 * | 10/2022 | Watson | ................. | E21B 43/129 |
| 11,519,259 B2 * | 12/2022 | Bangor | ................. | E21B 43/127 |

* cited by examiner

*Primary Examiner* — Kenneth L Thompson
(74) *Attorney, Agent, or Firm* — Kyle R. Miiller

(57)　　　　　　ABSTRACT

A plunger lift management system may measure a casing pressure data series of an annular space between a casing and a tubing. A plunger lift management system may measure a tubing pressure data series of the tubing. A plunger lift management system may generate a pressure differential data series based on the casing pressure data series and the tubing pressure data series. A plunger lift management system may, based on the pressure differential data series, a weight of a plunger, and a length of the tubing, identifying a weight of liquid lifted by the plunger.

20 Claims, 7 Drawing Sheets

460

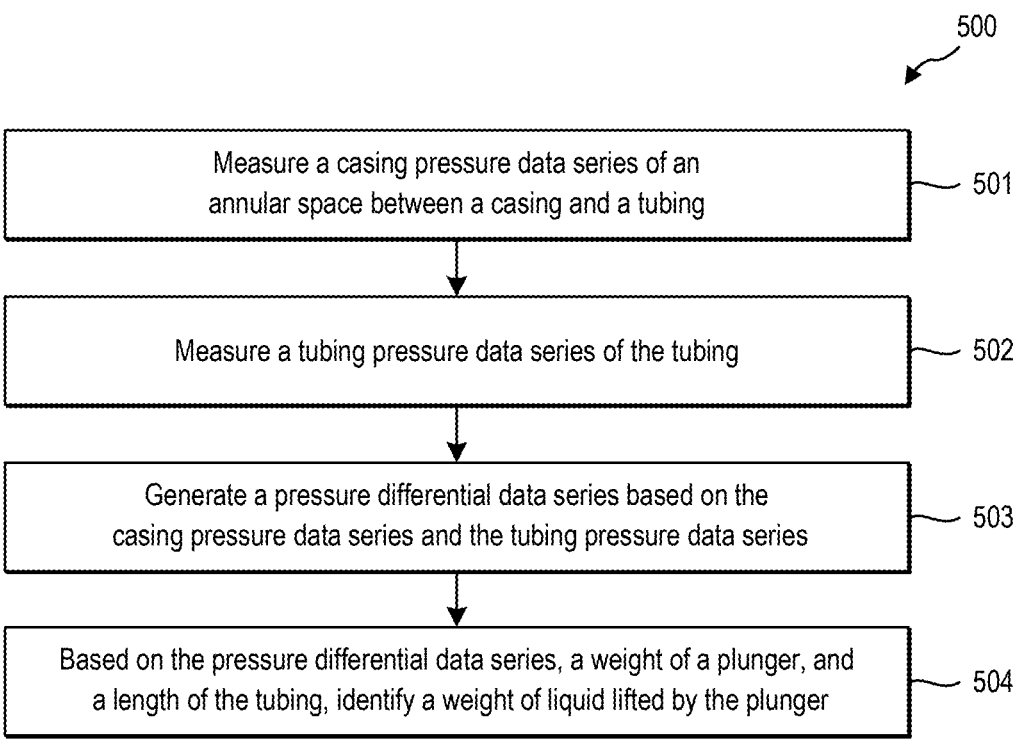

500

Measure a casing pressure data series of an
annular space between a casing and a tubing — 501

Measure a tubing pressure data series of the tubing — 502

Generate a pressure differential data series based on the
casing pressure data series and the tubing pressure data series — 503

Based on the pressure differential data series, a weight of a plunger, and
a length of the tubing, identify a weight of liquid lifted by the plunger — 504

FIG. 5

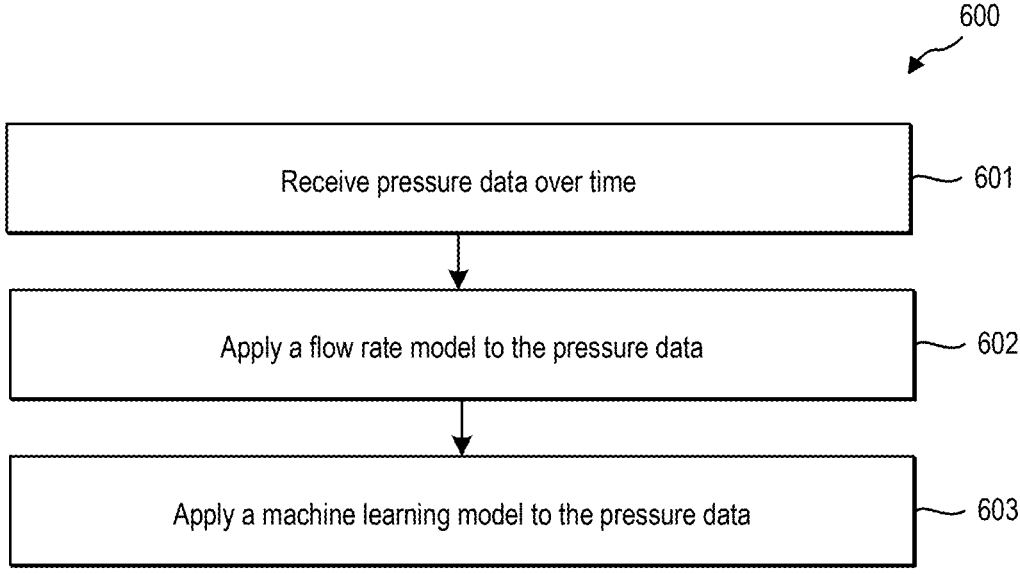

600

Receive pressure data over time — 601

Apply a flow rate model to the pressure data — 602

Apply a machine learning model to the pressure data — 603

FIG. 6

DEVICES, SYSTEMS, AND METHODS FOR ESTIMATING FLOW RATES IN A PLUNGER LIFT SYSTEM

BACKGROUND OF THE DISCLOSURE

Plunger lift systems are artificial lift systems that are used for enhancing production rate when the natural reservoir pressure becomes insufficient to lift produced fluids to the surface. Plunger lift systems are particularly useful towards the end of the life of the well when the reservoir pressure has reduced, and liquid production rate is low. Plunger lift systems are installed in many types of wells, including wells producing liquid (e.g., liquid hydrocarbons and/or water), wells producing a gas (e.g., natural gas, hydrocarbon-based gasses), and wells producing a combination of both liquid and gas. Many wells having plunger lift systems installed often lack flow meters due to the cost associated with them, making it difficult to monitor production. As a result, production rates are indirectly calculated by allocation and are infrequently directly measured, which leads to inaccuracies in well management decisions. This lack of real-time data hinders the ability to make informed decisions related to operational steps for production optimization.

SUMMARY

In some aspects, the techniques described herein relate to a method for operating a plunger lift system in a well. A plunger lift management system measures a casing pressure data series of an annular space between a casing and a tubing. The plunger lift management system measures a tubing pressure data series of the tubing. The plunger lift management system generates a pressure differential data series based on the casing pressure data series and the tubing pressure data series. Based on the pressure differential data series, the weight of a plunger, and a length of the tubing, the plunger lift management system identifies a weight of liquid lifted by the plunger.

In some aspects, the techniques described herein relate to a method for operating an artificial lift system in a well. A plunger lift management system receives pressure data over time. The plunger lift management system applies a flow rate model to the pressure data. The flow rate model outputs a mass of fluid produced over time based on the pressure data, a mass of a plunger, and a length of a tubing. The plunger lift management system applies a machine learning model to the pressure data, the mass of the plunger, and the length of the tubing. The machine learning model outputs an adjustment to one or more parameters of the flow rate model.

In some aspects, the techniques described herein relate to a plunger lift management system. The plunger lift management system includes a plunger having a plunger weight, a casing pressure sensor, and a tubing pressure sensor. The plunger lift management system includes a processor and memory, the memory including instructions that cause the processor to measure, using the casing pressure sensor, a casing pressure data series of an annular space between a casing and a tubing. The tubing pressure sensor further measures a tubing pressure data series of the tubing. The plunger lift management system generates a pressure differential data series based on the casing pressure data series and the tubing pressure data series. The plunger lift management system applies a flow rate model to the pressure differential data series, the weight of a plunger, and a length of the tubing. The flow rate model outputs a weight of liquid lifted by the plunger.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2 is a schematic representation of a plunger lift flow estimation system, according to at least one embodiment of the present disclosure.

FIG. 5 is a flowchart of a method for operating a plunger lift system in a well, according to at least one embodiment of the present disclosure.

FIG. 6 is a flowchart of a method for operating a plunger lift system in a well, according to at least one embodiment of the present disclosure.

DETAILED DESCRIPTION

Figure 1:
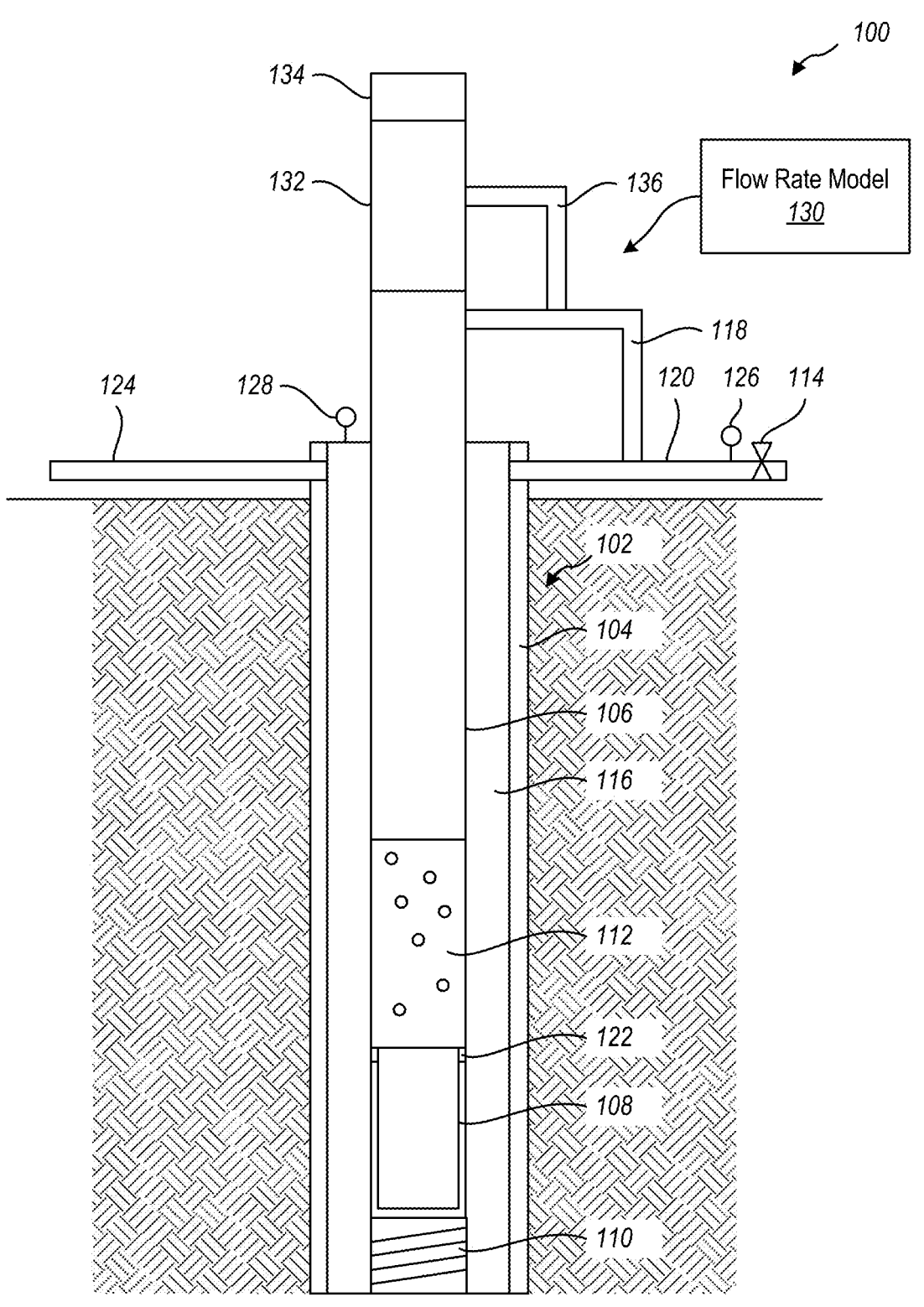
FIG. 1-1 and FIG. 1-2 are schematic representations of a plunger lift system, according to at least one embodiment of the present disclosure.

This disclosure generally relates to devices, systems, and methods for monitoring and adjusting the operation of an artificial lift system. Artificial lift is the process of adjusting the pressure of a producing well to improve the production of hydrocarbons. Some wellbores, particularly wellbores that have been producing for some time, may have a reduced flow rate. This may occur as the natural pressure in the reservoir and thus wellbore reduces. In some situations, liquid may accumulate at the bottom of the wellbore to a point that the hydrostatic pressure of the liquid becomes great enough that it reduces the production rate of the wellbore. In some situations, the hydrostatic pressure from the liquid may overcome the wellbore pressure, thereby causing the well to stop producing, including to stop producing liquids, gasses, or a combination of liquids and gases.

Various artificial lift systems exist. For example, as discussed in further detail herein, a plunger lift system may utilize a plunger located in an inner tubing inserted into the wellbore. The plunger lift system may facilitate an increase in gas pressure in the well, such as by closing a production valve at a surface location and/or injecting pressurized gas into the annular space between the tubing and the casing of the wellbore. When the gas pressure has increased, the production valve may be opened, and the pressure may cause the plunger and any liquid that has accumulated above the plunger to move upwards to the surface for collection.

Gas and Oilfields often include multiple producing wells. The producing wells may pump or direct the produced gas and fluid to collection, transfer, and processing facilities, eventually reaching a loadout location, where the produced gas and fluid are loaded onto trucks and/or pumped into a transportation pipeline. The production of individual wells may not be regularly tracked. For example, the oilfield production may be tracked downstream after the production from multiple wells has been combined. This may result in an inability to identify the individual contribution from a particular well. While embodiments of the present disclosure directly discuss the collection of hydrocarbons, including natural gas and crude oil, it should be understood that the techniques of the present disclosure may be applied to any fluid and gas producing wells, including the extraction of ions dissolved in a brine for use in in-situ mining operations and solution mining and extraction operations.

In accordance with at least one embodiment of the present disclosure, a flow rate model may utilize pressure of the annular space between the casing and the tubing and the wellhead pressure of the tubing to identify the flow rate of the well. The flow rate model identifies the weight of liquid lifted out of the well in a pass of the plunger by using the change in pressure over time, the weight of the plunger, the length that the plunger traveled in tubing on the upstroke, and the travel time of the plunger. In this manner, the flow rate model may accurately and in real-time (e.g., with every measurement received from the pressure sensors) identify the production rate of the well.

In some embodiments, a machine learning model may be trained on the flow rate model and associated production data. The machine learning model may output one or more adjustments to the flow rate model. For example, the production of the well may be measured to validate the flow rate model. The production of the well may be measured in any manner, including production over a single cycle of the plunger and/or production over multiple cycles (including multiple days, weeks, or months). The machine learning model may be trained on the input pressure data series to the flow rate model, the calculated weight of fluid produced, and the measured production volume. The machine learning model may be used to fine-tune the flow rate model. For example, the machine learning model may be used to adjust one or more assumptions to the flow rate model, including assumptions of the weight of the plunger, the friction between the plunger and the tubing, and so forth. This may help to improve the accuracy of the model.

In some embodiments, the machine learning model may be trained based on a plunger status of the plunger. For example, the plunger status may include an amount of wear experienced by the plunger, an amount of wear shown by the seals of the plunger, a status of the one-way valve of the plunger, a structural stability of the plunger, and so forth. The machine learning model may be trained to output a predicted plunger status based on the input pressure differential data series. In some embodiments, the machine learning model may be trained to output a maintenance recommendations. In this manner, the machine learning model may facilitate the accurate identification of the production of the well, adjustment of operational parameters of the well, and identification of the status of well equipment, such as the plunger.

As used herein, the term "machine learning" refers to algorithms that generate data-driven predictions or decisions from known input data by modeling high-level abstractions. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandit models, linear regression models, classification models, logistical regression models, random forest models, support vector machines (SVMs) models, neural networks (convolutional neural networks, recurrent neural networks such as LSTMs, graph neural networks, etc.), or decision tree models. While embodiments of the present disclosure discuss machine learning models, it should be understood that any artificial intelligence technique algorithm and artificial intelligence training techniques may be used herein.

A machine learning model may be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some embodiments, a machine learning model may include one or multiple machine learning models that cooperatively generate one or more outputs based on corresponding inputs.

Figures 1, 2:
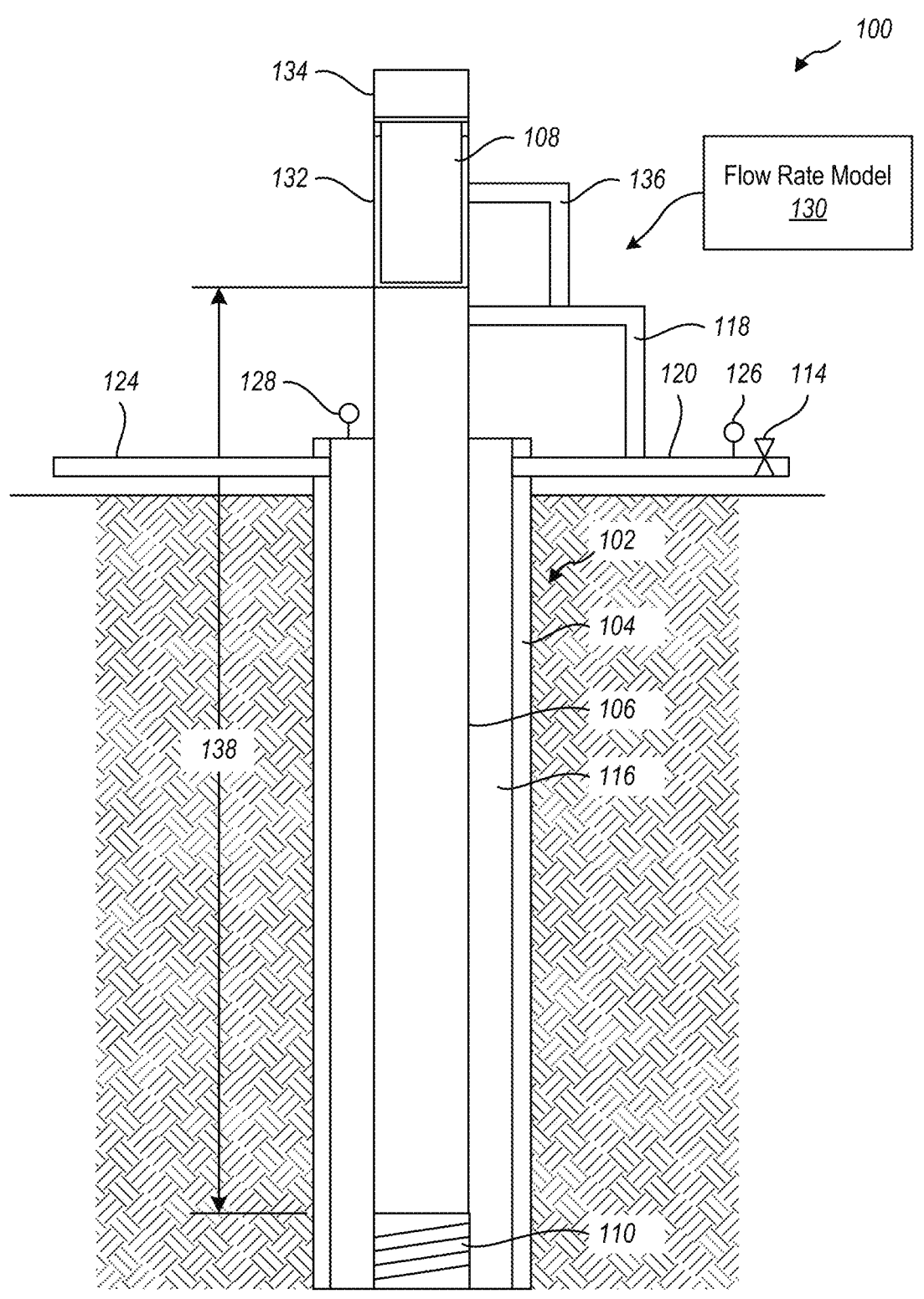
Figure 2:
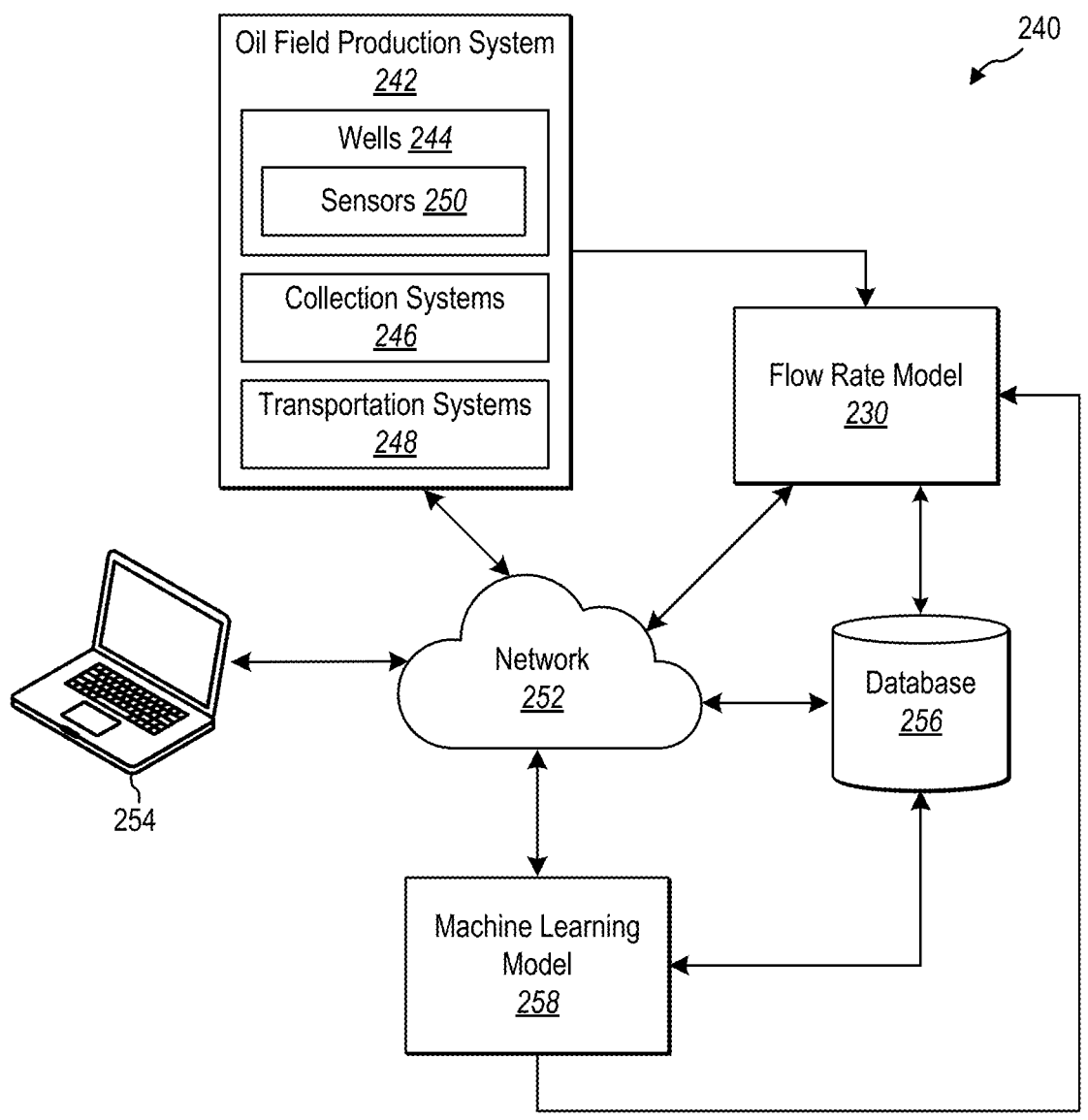

FIG. 1-1 and FIG. 1-2 are schematic representations of a plunger lift system 100, according to at least one embodiment of the present disclosure. The plunger lift system 100 shown includes a wellbore 102, a casing 104, and a tubing 106 extending into the wellbore 102 through the casing 104. The plunger lift system 100 may include a plunger 108 located inside the tubing 106. In the position shown, the plunger 108 is seated on a standing valve 110. The standing valve 110 may be a one-way valve that may facilitate fluid flow from the wellbore 102 and into the tubing 106. For example, the standing valve 110 may include a spring that may be depressed by the plunger 108 when the plunger 108 lands at the standing valve 110. Depressing the spring may allow fluid to pass into the tubing 106. The standing valve 110 may be located at, below, above, or near a production formation. For example, the standing valve 110 may be located at a formation that produces oil and gas. In the embodiment shown, the wellbore 102 has produced a slug 112 of fluid that has passed into the tubing 106 through the standing valve 110.

In the embodiment shown in FIG. 1-1, a production valve 114 is closed. This may allow or facilitate the buildup of pressure in an annular space 116 between the casing 104 and the tubing 106. Pressurized gas may pass into the tubing 106 at or around the standing valve 110 from the annular space 116. When the production valve 114 is opened, gas and liquid in the tubing 106 may pass out of the tubing 106, and the pressurized gas in the annular space 116 may push the plunger 108 and the slug 112 uphole (e.g., toward the surface). When the slug 112 reaches the surface, the slug 112 may be collected through a collection line 118, and the collected fluid (including liquid and gas) may pass to a production line 120 for collection, processing, and/or transportation.

The plunger 108 may include a one-way valve that may allow the plunger 108 to pass downhole, including through gas and fluid, while preventing fluid and gas from passing downhole past the plunger. The one-way valve may be any type of valve, such as a ball and seat, a flapper valve, and so forth. The plunger 108 may further include a seal 122, which may form a seal between the tubing 106 and the plunger 108. This may reduce or prevent the flow of fluid in the slug 112 downhole. The seal 122 may be any type of seal, such as a gasket, an O-ring, an interference fit between the seal 122 and the tubing 106, any other seal, and combinations thereof.

The plunger lift system 100 may include any type of plunger lift system. For example, the plunger lift system 100 may include an unassisted plunger lift system, where the pressure in the annular space 116 is accumulated by pressure in the surrounding formation, including the oil-producing formations. In the embodiment shown, the plunger lift system 100 includes a gas-assisted plunger lift (GAPL) system. In a GAPL system, an injection line 124 is connected to a pressure source, such as a compressor or pump. Pressurized gas may be injected into the annular space 116 between the casing 104 and the tubing 106 through the injection line 124. Injecting gas through the injection line 124 may facilitate higher pressures, faster cycling of the plunger 108 between the surface and the standing valve 110, and/or more even or predictable production from the plunger lift system 100. In some embodiments, the plunger lift system 100 may include a continuous-operation plunger-assisted gas lift (PAGL) system.

As discussed herein, the plunger lift system 100 may not include a flow sensor. Further, the plunger lift system 100 may not include any mechanism or system to determine the weight or volume of the slug 112. As a result, an operator may not be able to determine the production rate of the well.

In accordance with at least one embodiment of the present disclosure, the plunger lift system 100 may include a tubing pressure sensor 126 and a casing pressure sensor 128. The tubing pressure sensor 126 may measure the pressure of the tubing 106 at the outlet of the wellbore 102. For example, the tubing pressure sensor 126 may measure the pressure of the tubing 106 at the production line 120. However, it should be understood that the tubing pressure sensor 126 may be located in any location, such as at the collection line 118, at the tubing 106 above the surface, and so forth. The casing pressure sensor 128 may measure the pressure of the annular space 116 between the casing 104 and the tubing 106. The casing pressure sensor 128 may be located at any location. For example, the casing pressure sensor 128 may be in direct contact with the casing 104. In some examples, the casing pressure sensor 128 may be located at the injection line 124 to measure the pressure of the injected gas in a GAPL system. The casing pressure sensor 128 and/or the tubing pressure sensor 126 may be any type of sensor, gauge, or device that may measure or detect an absolute or relative pressure.

The tubing pressure sensor 126 may measure a tubing pressure data series and the casing pressure sensor 128 may measure a casing pressure data series. The tubing pressure data series and the casing pressure data series may be time-series pressure data, or pressure data measured over time. The measurement frequency of the tubing pressure data series and/or the casing pressure data series may be any of 1 measurement per 10 minutes, 1 measurement per 5 minutes, 1 measurement per minute, 1 measurement per 30 seconds, 1 measurement per 15 seconds, 1 measurement per 10 seconds, 1 measurement per 5 seconds, 1 Hz, 5 Hz, 10 Hz, 30 Hz, 60 Hz, or any value therebetween. In some embodiments, the measurement frequency of the tubing pressure sensor 126 (and the resulting tubing pressure data series) may be the same as the measurement frequency of the casing pressure sensor 128 (and the resulting casing pressure data series) may be the same. In some embodiments, the measurement frequency of the tubing pressure sensor 126 and the casing pressure sensor 128 may be different.

The tubing data series and the casing data series may be combined to form a pressure differential data series. For example, the measurements of the tubing data series may be subtracted from the measurements of the casing data series to form the pressure differential data series. In some examples, the measurements of the casing data series may be subtracted from the measurements of the tubing data series to form the pressure differential data series.

In FIG. 1-2, the production valve 114 has been opened, and the pressurized gas under the plunger 108 has pushed the plunger 108 up to a catcher 132. The catcher 132 may collect the plunger 108 and prevent the plunger 108 from traveling back downhole. For example, an operator may access the plunger from the catcher 132 for maintenance. In some examples, the plunger may remain in the catcher 132 while the wellbore 102 is producing oil and gas. In some embodiments, the plunger lift system 100 may further include a lubricator 134 that may facilitate lubrication of the plunger 108 during operation. The plunger lift system 100 may further include a catcher collection line 136 that may collect produced fluid pushed by the plunger 108 into the space of the catcher 132.

In accordance with at least one embodiment of the present disclosure, the plunger lift system 100 may include a flow rate model 130. The flow rate model 130 may determine the weight of the slug 112 based on the weight of the plunger 108, the pressure differential data series, a travel length 138 of the plunger 108, a time traveled for the plunger 108, and a cross-sectional area of the tubing 106.

The travel length 138 may be the entire distance of the tubing 106. For example, the standing valve 110 may be located at the foot of the tubing 106, and the plunger 108 may travel from the standing valve 110 to the catcher 132 at the surface. In some examples, the travel length 138 may be less than the entire distance of the wellbore 102. For example, the producing zone of the wellbore 102 may be higher than the bottom of the wellbore, and the standing valve 110 may be located at the producing zone of the wellbore 102. The travel length 138 may be any distance, including 100 m, 500 m, 1,000 m, 1,500 m, 2,000 m, 2,500 m, 3,000 m, 3,500 m, 4,000 m, 4,500 m, 5,000 m, 10,000 m, or any value therebetween.

In some embodiments, the travel time may be the travel time for the plunger 108 to travel from the standing valve 110 to the catcher 132. The travel time may be any time, including 1 min, 5 min, 15 min, 30 min, 1 hr., 1.5 hr., 2 hr., 2.5 hr., 3 hr., 4 hr., 5 hr., 12 hr. or any value therebetween.

The flow rate model 130 may determine the flow rate of the plunger lift system 100 by identifying the weight of the slug 112, determining the volume of the slug based on a known or assumed density of the fluid of the slug 112 (e.g., such as the density as determined at a processing or other loadout facility), and dividing the volume of the slug 112 by the cycle time for the plunger 108 to travel from the surface, to the standing valve 110, and back to the surface.

The flow rate model 130 may determine a combined weight of the plunger 108 and the slug 112 based on the pressure differential data series. For example, the pattern of the pressure differential data series may be correlated with the mass of the plunger 108 and the slug 112. The relationship between the pressure differential and the mass of the plunger 108 and the slug 112 may be generally expressed according to Eq. 1.

$$M_{comb}*(LT)=A\Delta P(t) \qquad \text{Eq. 1}$$

where $M_{comb}$ is the combined weight of the mass of the liquids column and the plunger, LT is a constant incorporating the travel length 138 and time traveled, A is the cross-sectional area of the tubing 106, and $\Delta P(t)$ is the time-function pressure differential between the casing pressure measured by the casing pressure sensor 128 and the tubing pressure measured by the tubing pressure sensor 126. As may be seen in Eq. 1, to identify the mass of the slug, the flow rate model 130 may analyze the time-function pressure differential data series with respect to the length, the total travel time, and the cross-sectional area of the tubing 106. In this manner, the flow rate model 130 may determine the weight of the slug 112 without a flow meter and using three measured parameters, the casing pressure, the tubing pressure, and the travel time. However, it should be understood that other parameters may be modeled or incorporated in Eq. 1, such as temperature of the injected gas, temperature of the produced fluid, and friction between the plunger 108 and the tubing 106.

In some embodiments, the casing pressure and/or the tubing pressure may be measured downhole. For example, a wellbore 102 may include a pressure sensor at the standing valve 110. The flow rate model 130 may utilize the pressure as measured at the standing valve 110 to determine the pressure differential. Put another way, the pressure differential may include the pressure difference between the pressure as measured at the standing valve 110 and the pressure as measured at the tubing pressure sensor 126. Measuring the pressure downhole may improve the accuracy of the determined weight of the slug 112.

The plunger lift system 100 may identify the amount of time that the plunger 108 takes to travel from surface to the standing valve 110, and the amount of time that the plunger 108 takes to travel from the standing valve 110 to the surface. Incorporating the travel time for a single pass from the surface to the standing valve 110 may allow the flow rate model 130 to associate the pressure differential data series with the associated portion of travel. This may further improve the accuracy of the determined weight of the slug 112.

FIG. 2 is a schematic representation of a plunger lift flow estimation system 240, according to at least one embodiment of the present disclosure. An oil field production system 242 may include multiple wells 244. The wells 244 may produce oil and gas, which are collected at collection systems 246, processed, and shipped or transported using transportation systems 248. As discussed herein with respect to FIG. 1-1 and FIG. 1-2, the multiple wells 244 may include sensors 250 at each of the wellbores. The sensors 250 may measure various properties of the wells, including pressure (e.g., the tubing pressure sensor 126 and the casing pressure sensor 128 of FIG. 1-1 and FIG. 1-2), time, temperature, and so forth.

The plunger lift flow estimation system 240 may utilize a flow rate model 230 to estimate or determine the individual flow rates for the multiple wells 244. For example, the flow rate model 230 may receive pressure data from the sensors 250 and wellbore data from the wells 244 (such as wellbore length and tubing area). The flow rate model 230 may estimate the individual production of each of the wells 244 using the associated pressure differential data series and wellbore information.

The elements of the plunger lift flow estimation system 240 may be in communication over a network 252, such as the internet, radio, satellite, or cellular network. In some embodiments, the flow rate model 230 may be located at a central facility, and the flow rate model 230 may receive the pressure differential data series from the oil field production system 242 over the network 252. In some embodiments, the flow rate model 230 may be located at the well 244. For example, a particular well 244 may have a processor on site, and the processor may run software associated with the flow rate model 230. In some examples, the flow rate model 230 may be or operated on a remote computing device, such as on a virtual machine on the cloud, or on a user device 254 at a regional or corporate office. In some embodiments, the user device 254 may include a mobile device, such as a laptop computer, a cellular phone (e.g., a smartphone), or a tablet. In some embodiments, the machine learning model 258 may be located on the user device 254 at the wellbore. In some embodiments, the machine learning model 258 may be located on a computing device remote from the wellbore, and the techniques of the present disclosure may be implemented at a computing device remote from the wellbore.

In some embodiments, the measured pressures (and resulting pressure differential data series) may be stored in a database 256. The database 256 may further associate the measured pressures with a particular well 244 and associated well information. The well information may include length of the wellbore and equipment information. The equipment information may include a particular plunger model, including plunger model details such as manufacturer, type, manufactured weight, size, shape, seals, valve types, and so forth. In some embodiments, the equipment information may include cost and maintenance information associated with the plunger and other components of the plunger lift system. For example, the equipment information may include maintenance records, maintenance actions, maintenance frequency, maintenance costs, and other maintenance information. In some embodiments, the database 256 may include historical pressure data, maintenance performed, workovers, maintenance costs, and well information. In some embodiments, the database 256 may include operational decisions, including gas inflow decisions, valve release or triggering decisions, plunger replacement due to wear and tear, plunger type swap, or other operational decisions or changes made during operation of the plunger lift system. The flow rate model 230 may be applied to the historical pressure data and well information and the resulting estimated production flow rates may be stored in the database 256.

In some embodiments, the oil field production system 242 may include flow meters that may periodically or episodically measure the flow rate of one or more of the wells 244. For example, an operator may bring a flow meter to an individual well 244. The flow meter may measure the production of the well 244 in real time, and the production of the well may be associated with pressure measurements and distance traveled by the plunger. This may be used to validate and/or calibrate the flow rate model 230 and/or train a machine learning model or artificial intelligence model, as discussed below. In some examples, the flow meter may be located downstream of the wells 244. For example, the flow meter may be located at the collection systems 246 and may measure the output of multiple wells. In some examples, the flow meter may measure the oil and gas that are transported via the transportation systems 248. In some embodiments, the flow meter may collect data over time. For example, the collection systems 246 may maintain a record of the production of multiple wells 244 collected over a period of time.

In accordance with at least one embodiment of the present disclosure, the plunger lift flow estimation system 240 may include a machine learning model 258 or other artificial intelligence model. In some embodiments, the machine learning model 258 may be trained to refine the flow rate model 230. For example, the machine learning model 258 may be trained on the well information in the database 256, including the estimated production flow rates and the associated known or measured flow rate or production information.

The trained machine learning model 258 may be used to refine or adjust the parameters of the flow rate model 230. For example, the machine learning model 258 may be used to refine one or more assumptions used in creation of the flow rate model 230. Such assumptions may include the weight of the plunger, the friction forces of the plunger with the casing wall, the pressure signal or patterns at various locations in the tubing (e.g., at the standing valve, at doglegs), and so forth. In some examples, the machine learning model 258 may provide or recommend adjustments to the flow rate model 230. For example, the machine learning model 258 may recommend an adjustment to Eq. 1, such as an adjustment to one or more elements of the LT constant, an adjustment to the assumed weight of the plunger, an adjustment to or an addition to Eq. 1 to account for friction of the plunger with the tubing, and so forth.

In some embodiments, the machine learning model 258 may be trained on equipment type and/or equipment status, as stored in the database 256. For example, the machine learning model 258 may be trained on the make and model of the plunger, the plunger status, the status of the seal, valve, or structure of the plunger, and so forth. The trained machine learning model 258 may output the equipment type or status, which an operator may use to refine operation of the artificial lift system, plan maintenance activities, plan replacement activities, and so forth. In some embodiments, the machine learning model 258 may identify correlations between plunger type and/or manufacturer and operational parameters. For example, the machine learning model 258 may identify correlations between plunger type and/or manufacturer and longevity, wear, maintenance, and so forth. In some embodiments, the machine learning model 258 may provide recommendations to an operator based on this analysis, including recommendations regarding which plungers to select and their anticipated operational lifetime.

In some embodiments, applying the flow rate model 230 to the pressure data from the sensors 250 may be used to adjust one or more operating parameters. For example, the flow rate model 230 may be used to adjust a cycling time of the artificial lift system, including the opening and closing of the production valve and/or plunger launch valve. In some examples, the flow rate model 230 may be used to adjust the injection pressure, such by identify an operating position of the choke valve of the injection system of a GAPL and recommending a change to the operating position of the choke valve.

In some embodiments, the machine learning model 258 may be trained on data from a single well 244. The machine learning model 258 may adjust the flow rate model 230 and/or output information regarding the equipment status. In this manner, the flow rate model 230 may be tailored for that particular well 244.

In some embodiments, the machine learning model 258 may be trained on multiple wells 244. For example, the machine learning model 258 may be trained on the total production data for an entire oilfield, or production data for a plurality of wells 244 that direct production fluid to the same collection systems 246 and/or transportation systems 248. The machine learning model 258 may generate insights or correlations between the multiple wells 244. In some embodiments, the machine learning model 258 may split the total production stream into the various wells 244 in the oilfield. For example, the machine learning model 258 may apportion a percentage of the total production to each of the wells 244 in the oilfield. The machine learning model 258 may then be trained for the individual wells 244 on the identified percentage of total production. In some embodiments, the machine learning model 258 may adjust the parameters of the individual flow rate models 230 to balance the estimated production of the individual flow rate models 230 to the total production values. In this manner, the wells 244 may be trained on the total production numbers, thereby reducing over or under reporting production numbers according to the flow rate model 230 for each well 244.

In accordance with at least one embodiment of the present disclosure, the plunger lift flow estimation system 240 may collect and archive the measured data, production determinations, recommendations, changes, and so forth in the database 256. The machine learning model 258 may further be trained on the collected historical data to identify trends, patterns, and other correlations between the collected data and the operation of the well. For example, the machine learning model 258 may identify patterns between the sensor data and the operational lifetime of the plunger. For example, the machine learning model 258 may identify signatures or patterns in the data that identifies when the plunger has experienced wear and/or is due for replacement. In some examples, the machine learning model 258 may prepare recommendations regarding replacement of the plunger, and/or the replacement of plunger types in the wellbore.

As discussed herein, the oil field production system 242 and/or the machine learning model 258 may, based on the received sensor data and determined production data, generate recommendations to improve or optimize the production of the plunger lift system. For example, the oil field production system 242 and/or machine learning model 258 may generate recommendations regarding how to increase the production of a particular well over a period of time. For example, the oil field production system 242 and/or machine learning model 258 may generate recommendations to open or close the production valve, open or close the plunger release valve, adjust the choke position of the gas flow of the injection line, or other operational recommendations. In this manner, the plunger lift flow estimation system 240 may improve the production of one or more wells.

In some embodiments, the plunger lift flow estimation system 240 may monitor and/or provide recommendations for the operation of plunger lift systems in multiple wells. For example, the plunger lift flow estimation system 240 may receive sensor data from multiple wells and generate operational recommendations (including plunger replacement recommendations) for each of the wells in a given area. In some embodiments, the plunger lift flow estimation system 240 may direct resources to the various wells, including injection gas resources. For example, the plunger lift flow estimation system 240 may optimize the delivery of gas to multiple wells based on the sensor measurements.

Figure 3:
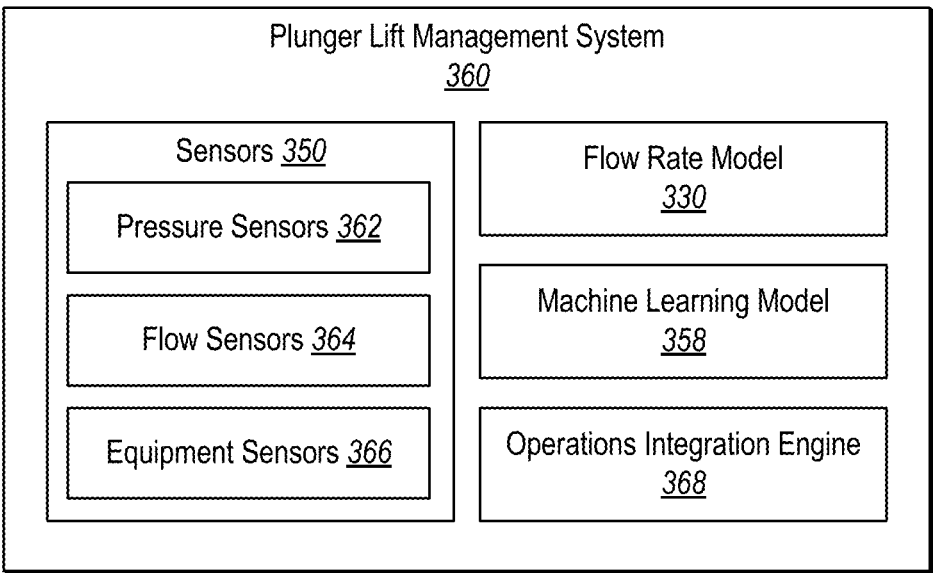
FIG. 3 is a representation of a plunger lift management system, according to at least one embodiment of the present disclosure.

FIG. 3 is a representation of a plunger lift management system 360, according to at least one embodiment of the present disclosure. Each of the components of the plunger lift management system 360 can include software, hardware, or both. For example, the components can include one or more instructions stored on a computer-readable storage medium and executable by processors of one or more computing devices, such as a client device or server device. When executed by the one or more processors, the computer-executable instructions of the plunger lift management system 360 can cause the computing device(s) to perform the methods described herein. Alternatively, the components can include hardware, such as a special-purpose processing device to perform a certain function or group of functions. Alternatively, the components of the plunger lift management system 360 can include a combination of computer-executable instructions and hardware.

Furthermore, the components of the plunger lift management system 360 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The plunger lift management system 360 may collect measurements from sensors 350 regarding the operating state of a plunger lift system. The sensors 350 may include any operational state sensors, such as pressure sensors 362, flow sensors 364, and equipment sensors 366, or other sensors, such as an arrival sensor at the surface. The sensors 350 may collect data over time. For example, the pressure sensors 362 may collect time-series data of the pressure of the plunger lift system over time. The pressure sensors 362 may collect data over the period of the plunger traveling from the surface to the standing valve, from the standing valve to the surface, or from the surface to the standing valve and back to the surface. As discussed herein, the pressure sensors 362 may measure any pressure of the plunger lift system, including a wellhead pressure, a flowline pressure, a back pressure, a bottomhole pressure, or other pressures of the plunger lift system.

As discussed herein, the flow sensors 364 may include any type of flow sensor, including flow sensors located permanently at a wellsite, flow sensors brought to a wellsite by an operator during an audit of the operation of the plunger lift system, flow sensors located at collection, processing, and transportation facilities, and so forth. The flow sensors 364 may collect production over time. For example, the flow sensors 364 may collect production data for a single stroke or cycle of the plunger. In some examples, the flow sensors 364 may collect production data for multiple strokes or cycles of the plunger. In some examples, the flow sensors 364 may collect production data that is averaged over days, weeks, months, or years. In some embodiments, the produced volume may be measured in other ways, including based on barrels of oil sold or shipped at a loadout, such as from a loadout ticket or other production report. In some embodiments, the produced volume may be measured based on the depth or filled volume of a storage tank or set of tanks. The produced volume may be measured or determined in any other manner based on shipping, pipeline, collection, pumping, flow meters, or other data available to an operator.

In some embodiments, the equipment sensors 366 may measure measurable statuses of equipment on site at the wellsite. For example, the equipment sensors 366 may measure the presence of the plunger at the surface, such as at the catcher and/or at the lubricator. In some examples, the equipment sensors 366 may measure the presence of the plunger downhole, such as at the standing valve. In some examples, the equipment sensors 366 may measure the operating state of the various valves, such as the production valve, the choke of the injection system, and so forth. In some examples, the equipment sensors 366 may measure the operating state of auxiliary equipment, such as the injection pump, transportation pumps and compressors, and so forth.

The plunger lift management system 360 may further include a flow rate model 330. As discussed herein, the flow rate model 330 may receive pressure information from the pressure sensors 362 to estimate the weight of produced fluid from the well. For example, the flow rate model 330 may identify a correlation between the pressure differential between the tubing and the casing over time, the weight of the produced fluid, the weight of the plunger, the distance traveled, and the travel time of the plunger. In this manner, the flow rate model 330 may provide an estimated flow rate of the produced fluid.

As discussed herein, a machine learning model 358 may be trained using the sensor data from the sensors 350 and/or additional information, such as plunger status information, including plunger weight, plunger seal status, plunger type, plunger geometry, and so forth. The machine learning model 358 may be trained on the flow rate model 330 and provide recommendations or adjustments to the flow rate model 330. For example, training the machine learning model 358 on production information from the flow sensors 364 and pressure information from the pressure sensors 362 may enable the machine learning model 358 to adjust one or more parameters of the flow rate model 330.

The plunger lift management system 360 may further include an operations integration engine 368. The operations integration engine 368 may adjust operation of the plunger lift system based on the output of the flow rate model 330 and/or the machine learning model 358. For example, when the flow rate model 330 identifies that estimated fluid production has dropped below a threshold, the operations integration engine 368 may adjust the operating parameters of the plunger lift system, or provide a recommendation to an operator to adjust the operating parameters of the plunger lift system, to increase the production. The operations integration engine 368 may adjust the operating parameters by adjusting the cycling of the production valve, adjusting the injection pressure of a GAPL or PAPL, or otherwise adjust operating parameters of the plunger lift system. In this manner, the operations integration engine 368 may increase or otherwise improve the production or operation of the well.

In some examples, based on the output of the operations integration engine 368 and/or the flow rate model 330, the operations integration engine 368 may provide a recommendation for maintenance of equipment of the plunger lift system. For example, the operations integration engine 368 may provide a recommendation to replace the seals of the plunger, repair or replace a valve of the plunger, replace the plunger, repair or replace the standing valve, or otherwise provide maintenance recommendation of the plunger lift system. In some embodiments, the recommendations may include operational recommendations to an operator, and the operator may choose which (if any) of the operational recommendations to implement.

Figure 4:
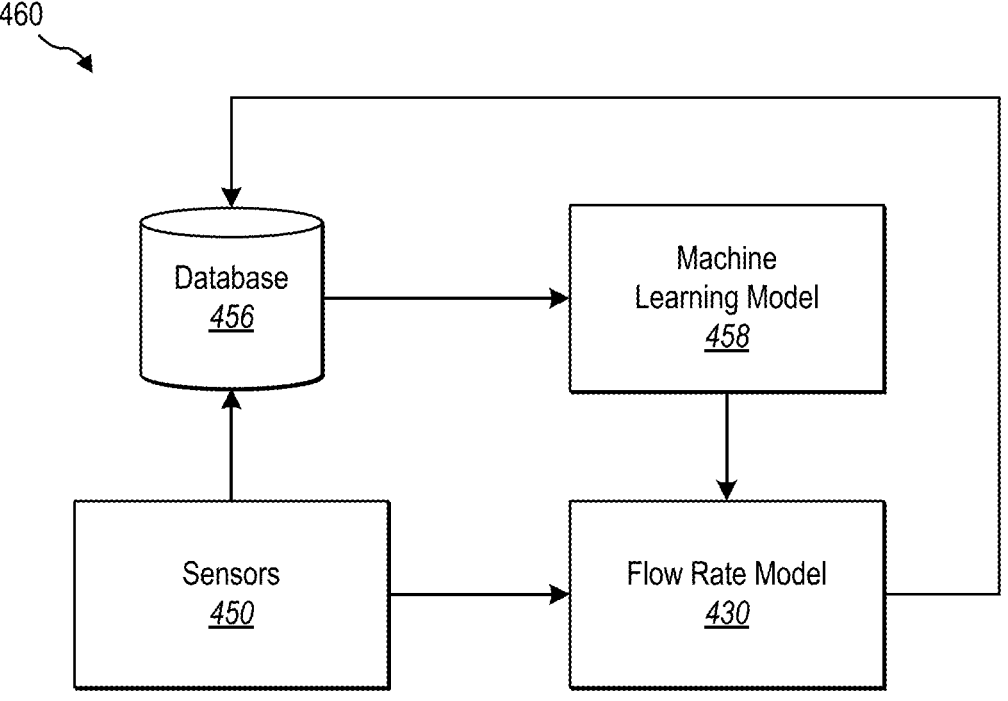
FIG. 4 is a flow diagram of a plunger lift management system, according to at least one embodiment of the present disclosure.

FIG. 4 is a flow diagram of a plunger lift management system 460, according to at least one embodiment of the present disclosure. In the plunger lift management system 460 shown, sensors 450 at a wellsite may be provided or input into a flow rate model 430. The flow rate model 430 may output an estimated flow rate or production rate of the wellsite using the information from the sensors. For example, as discussed herein, the flow rate model 430 may output an estimated flow rate of the wellsite using input pressure data, travel distance, travel time, and plunger weight.

The sensors 450 may provide the sensor data to a database 456. The database 456 may further include at least some correlating information, such as measured flow rate or production information. The measured flow rate or production information may be used to validate the flow rate model 430.

In accordance with at least one embodiment of the present disclosure. a machine learning model 458 may be trained on production and sensed information in the database 456. The machine learning model 458 may be used to adjust one or more parameter of the flow rate model 430. For example, the trained machine learning model 458 may generate an output that may cause an adjustment of one of the parameters, constants, or relationships of the flow rate model 430. In some embodiments, the output of the flow rate model 430 may be used to fine-tune the machine learning model 458. In some embodiments, the output of the flow rate model 430 may be correlated with measured production flow rate information. This may generate a feedback loop that may further refine and improve the estimated production information by the flow rate model 430.

FIG. 5 and FIG. 6, the corresponding text, and the examples provide a number of different methods, systems, devices, and computer-readable media of the plunger lift management system. In addition to the foregoing, one or more embodiments can also be described in terms of flow-charts comprising acts for accomplishing a particular result, as shown in FIG. 5 and FIG. 6. FIG. 5 and FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 5 illustrates a flowchart of a series of acts or a method 500 for operating a plunger lift system, according to at least one embodiment of the present disclosure. While FIG. 5 illustrates acts according to one embodiment, alternative embodiments may omit, add to, reorder, and/or modify any of the acts shown in FIG. 5. The acts of FIG. 5 can be performed as part of a method. Alternatively, a computer-readable medium can comprise instructions that, when executed by one or more processors, cause a computing device to perform the acts of FIG. 5. In some embodiments, a system can perform the acts of FIG. 5.

A casing pressure sensor may measure a casing pressure data series (e.g., casing pressure over a time period) of an annular space between a casing and a tubing at 501. A tubing pressure sensor may measure a tubing pressure data series (e.g., tubing pressure over the time period) of the tubing at 502. A pressure differential data series may be generated based on the casing pressure data series and the tubing pressure data series at 503. Based on the pressure differential data series, a weight of a plunger, and a length of the tubing, a flow rate model may identify a weight of liquid lifted by the plunger at 504. The flow rate model may estimate the flow rate of the well by averaging the weight of the liquid over the measurement period or the time period that the casing pressure and the tubing pressure were measured.

A plunger lift management system may adjust at least one parameter of the plunger lift system based on the weight of the liquid. In some embodiments, the plunger lift management system may adjust a production valve to adjust a flow rate of the plunger lift system based on the weight of the liquid. In some embodiments, the casing pressure and the tubing pressure are measured at the surface. In some embodiments, the plunger lift system includes a PAGL system or a GAPL system, and identifying the casing pressure includes an injection pressure of the PAGL system or GAPL system.

In some embodiments, the plunger lift management system may identify when the plunger reaches a bottom of the tubing. The plunger lift management system may measure the casing pressure data series and the tubing pressure data series by measuring the casing pressure data series and the tubing pressure data series over a travel time for the plunger from the surface, to the bottom of the tubing, and back to a surface location.

As mentioned, FIG. 6 illustrates a flowchart of a series of acts or a method 600 for operating an artificial lift system, according to at least one embodiment of the present disclosure. While FIG. 6 illustrates acts according to one embodiment, alternative embodiments may omit, add to, reorder, and/or modify any of the acts shown in FIG. 6. The acts of FIG. 6 can be performed as part of a method. Alternatively, a computer-readable medium can comprise instructions that, when executed by one or more processors, cause a computing device to perform the acts of FIG. 6. In some embodiments, a system can perform the acts of FIG. 6.

In some embodiments, a plunger lift management system may receive pressure data over time at 601. For example, as discussed herein, the pressure data may include casing pressure and tubing pressure. The plunger lift management system may apply a flow rate model to the pressure data at 602. The flow rate model may output a mass of fluid produced over the time based on the pressure data, a mass of a plunger, and a length of a tubing. The plunger lift management system may apply a machine learning model to the pressure data, the mass of the plunger, and the length of the tubing at 603. The machine learning model may output an adjustment to one or more parameters of the flow rate model.

Figure 7:
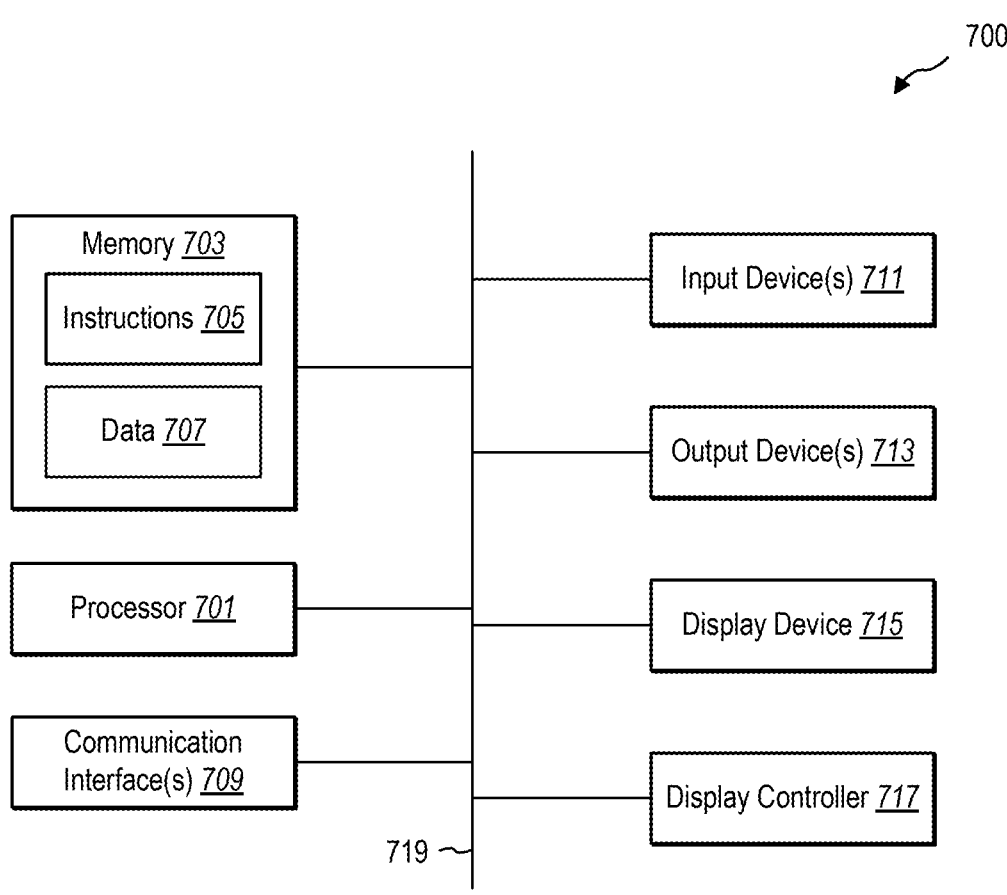
FIG. 7 is a representation of a computer system, according to at least one embodiment of the present disclosure.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for operating a plunger lift system in a well, the method comprising:

measuring a casing pressure data series of an annular space between a casing and a tubing;

measuring a tubing pressure data series of the tubing;

generating a pressure differential data series based on the casing pressure data series and the tubing pressure data series; and based on the pressure differential data series, a weight of a plunger, and a length of the tubing, identifying a weight of liquid lifted by the plunger.

2. The method of claim 1, further comprising adjusting at least one parameter of the plunger lift system based on the weight of liquid.

3. The method of claim 1, further comprising adjusting a production valve to adjust a flow rate of the plunger lift system based on the weight of liquid.

4. The method of claim 1, wherein the casing pressure data series and the tubing pressure data series are measured at a surface location.

5. The method of claim 1, further comprising identifying when the plunger reaches a bottom of the tubing, and measuring the casing pressure data series and the tubing pressure data series includes measuring the casing pressure data series and the tubing pressure data series over a travel time for the plunger from the bottom of the tubing to a surface location.

6. The method of claim 1, wherein the plunger lift system includes a plunger-assisted gas lift system or a gas-assisted plunger lift system.

7. The method of claim 6, wherein measuring the casing pressure data series includes measuring an injection pressure of the plunger-assisted gas lift system.

8. A method for operating an artificial lift system in a well, the method comprising:
  receiving pressure data over time;
  applying a flow rate model to the pressure data, the flow rate model outputting a mass of fluid produced over the time based on the pressure data, a mass of a plunger, and a length of a tubing; and
  applying a machine learning model to the pressure data, the mass of the plunger, and the length of the tubing, the machine learning model outputting an adjustment to one or more parameters of the flow rate model.

9. The method of claim 8, wherein the adjustment includes an adjustment to the mass of the plunger.

10. The method of claim 8, further comprising adjusting at least one operating parameter of the artificial lift system based on the mass of fluid produced over the time.

11. The method of claim 8, further comprising:
  receiving measured production over the time; and
  training the machine learning model with the pressure data, and the measured production.

12. The method of claim 11, further comprising receiving a plunger status of the plunger, and wherein training the machine learning model includes training the machine learning model based on the plunger status.

13. The method of claim 12, wherein the plunger status includes preventative maintenance associated with the plunger status, wherein the machine learning model is trained to output a preventative maintenance recommendation.

14. The method of claim 11, wherein receiving the measured production includes receiving the measured production from a flow meter located at the well.

15. The method of claim 8, wherein the adjustment includes an adjustment to tailor the flow rate model specific to the well.

16. A plunger lift management system, comprising:
  a plunger having a plunger weight;
  a casing pressure sensor;
  a tubing pressure sensor; and
  a processor and memory, the memory including instructions that cause the processor to:
    measure, using the casing pressure sensor, a casing pressure data series of an annular space between a casing and a tubing;
    measure, using the tubing pressure sensor, a tubing pressure data series of the tubing;
    generating a pressure differential data series based on the casing pressure data series and the tubing pressure data series; and
    apply a flow rate model to the pressure differential data series, the plunger weight of the plunger, and a length of the tubing, the flow rate model outputting a weight of liquid lifted by the plunger.

17. The plunger lift management system of claim 16, wherein the casing pressure sensor is located downhole.

18. The plunger lift management system of claim 16, further comprising applying a machine learning model to the pressure differential data series, the machine learning model outputting an adjustment to the flow rate model.

19. The plunger lift management system of claim 18, wherein the adjustment includes an adjustment to the plunger weight.

20. The plunger lift management system of claim 18, further comprising a flow rate sensor, the flow rate sensor measuring a flow rate of fluid lifted by the plunger, and further comprising training the machine learning model based on the flow rate of the liquid and the pressure differential data series.

* * * * *